United States Patent [19]

Leshik

[11] Patent Number: 5,221,549

[45] Date of Patent: Jun. 22, 1993

[54] READY-TO-EAT, POLYPHOSPHATE-CONTAINING PUDDINGS

[75] Inventor: Richard R. Leshik, Brookfield, Conn.

[73] Assignee: Kraft General Foods, Inc., Northfield, Ill.

[21] Appl. No.: 800,807

[22] Filed: Nov. 27, 1991

[51] Int. Cl.$^5$ .............................................. A23L 1/187
[52] U.S. Cl. .................................... 426/579; 426/804
[58] Field of Search ................ 426/577, 578, 579, 804

[56] References Cited

U.S. PATENT DOCUMENTS

| | | | |
|---|---|---|---|
| 2,949,366 | 8/1960 | Hunter et al. | 99/131 |
| 3,231,391 | 1/1966 | Breivik et al. | 99/139 |
| 3,726,690 | 4/1973 | Schuppner | 426/577 |
| 3,934,049 | 1/1976 | Lauck | 426/573 |
| 4,056,566 | 11/1977 | Sakakibara et al. | 426/577 |
| 4,096,286 | 6/1978 | Sakakibara et al. | 426/577 |
| 4,623,552 | 11/1986 | Rapp | 426/575 |
| 4,788,075 | 11/1988 | Joseph et al. | 426/579 |
| 4,906,489 | 3/1990 | Flango, Jr. et al. | 426/579 |
| 4,931,302 | 6/1990 | Leshik et al. | 426/579 |
| 5,098,728 | 3/1922 | Singer et al. | 426/579 |

*Primary Examiner*—Jeanette Hunter
*Attorney, Agent, or Firm*—Thomas R. Savoie

[57] ABSTRACT

Polyphosphates such as tetrasodium polyphosphate and sodium acid polyphosphate are used to reduce the amount of protein aggregation which results from heat treating a ready-to-eat pudding formulation at temperatures in excess of 265° F.

11 Claims, No Drawings

READY-TO-EAT, POLYPHOSPHATE-CONTAINING PUDDINGS

BACKGROUND OF THE INVENTION

Consumers have in recent times been desirous of eating wholesome and nutritious snack foods. Milk-containing puddings have long been considered nutritious and wholesome foods. Consumers are, however, requiring that the foods they eat, particularly snack food and dessert items, be essentially ready-to-eat. Thus, the amounts of cooked puddings and even instant puddings prepared in the home environment has been decreasing in recent years.

To fill the desire of consumers for dessert or snack items which require no preparation on the part of the consumer, there exists ready-to-eat puddings which are usually marketed in single-service portions. Initially these products were marketed as shelf-stable, canned products. These canned puddings, which have been subjected to a retort step during processing, do not, however, possess the texture and flavor which consumers associate with home-cooked pudding. More recently, single-service portions of refrigerated, pudding products have entered the market.

A process and formulations for preparing aseptically-packaged pudding is described in commonly-assigned, U.S. Pat. No. 4,788,075 to Joseph et al. This patent is hereby incorporated by reference. The Joseph et al. patent describes the preparation of aseptically-packaged pudding which has a creamy texture comparable to cooked pudding and which contains milk solids, fat and relatively low level (below 5%) of a chemically-modified food starch.

Consumers also are desirous of reducing their caloric intake, hence low-fat and no-fat products which have a taste and texture comparable to their full-fat counterparts are much sought after. Unfortunately fat is a highly-functional ingredient in providing texture and mouthfeel and in controlling flavor perception in food products such as puddings. Thus it is not a simple matter to produce low/no fat Puddings which are acceptable to the consumer.

Other patents related to the production of aseptically-packaged and/or refrigerated puddings are U.S. Pat. Nos. 4,906,489 to Flango, Jr. et al. and 4,623,552 to Rapp. U.S. Pat. No. 4,888,194 to Andersen et al. discloses an aseptically-packaged, whippable dairy cream, having a fat content of about 35 to 40% by weight, which is made resistant to syneresis during standing as a whipped foam by the addition of a sodium alginate ingredient.

SUMMARY OF THE INVENTION

This invention relates to a formulation for preparing ready-to-eat pudding-like desserts which is subjected to ultra-high temperature (i.e., above 265° F.) during processing and packaged in a manner which results in sterility or a relatively-low level of microbiological activity. In accordance with this invention, the pudding may be packaged under aseptic conditions resulting in a shelf-stable product. Alternatively, the pudding may be packaged under controlled conditions which results in a low microbial count yielding a product that would be suitable for refrigerated distribution. As used in this invention the term "pudding" is meant to include viscous fluids which have a soft gel texture and a smooth, creamy mouthfeel and which typically contain milk or milk solids.

According to this invention a low level of polyphosphates, in particular pyrophosphates, is used to minimize and/or control the degree of protein aggregation in ultra-high temperature (above 265° F.) processed puddings. The term polyphosphate is meant to include materials which contain two or more phosphate ions per molecule.

Protein aggregation has been found to occur when ready-to-eat pudding formulations are processed at temperatures above 265° F., typically 275-300° F., in order to cook and/or sterilize the formulation in a relatively short period of time. This protein aggregation is evidenced by the development of a speckled, translucent appearance within the pudding and a chalky mouthfeel from the pudding. This appearance and mouthfeel are both negative attributes in ready-to-eat pudding.

Protein aggregation is a problem which grows as the fat level in ready-to-eat puddings decrease from the full fat level of 5 to 6% down to zero. Thus this invention will find great utility in the formulation of low and no fat puddings. This invention can however be utilized even in ready-to-eat, full-fat puddings since the presence of polyphosphates permits the reduction or elimination of emulsifier/stabilizer ingredients such as sodium stearoyl lactylate. This invention is useful in all-flavors of puddings including cocoa-containing (e.g., chocolate-flavored) and cocoa-free (e.g., vanilla-flavored) puddings.

The utility of this invention has been demonstrated by the elimination of visually perceived protein aggregates in high temperature-processed puddings and a measured reduction of protein aggregates to where essentially all of the aggregates have a maximum dimension of less than 40 microns, with a majority of aggregates being less than 10 microns in size. This contrasts to the visually-apparent protein aggregates which occur in fat-free pudding in the absence of polyphosphate, with a majority of these aggregates having a particle size in excess of 40 microns in size.

The use level for the polyphosphate will be from 0.005 to 0.5% by weight of the pudding. Pyrophosphates are the preferred polyphosphate material with tetrasodium pyrophosphate and disodium dihydrogen pyrophosphate, also known as sodium acid pyrophosphate, being two of the preferred pyrophosphates. Combinations of tetrasodium pyrophosphate and sodium acid pyrophosphate in about equal amounts is suitable for use in this invention.

Protein aggregation does not occur to a significant extent during high temperature processing of full fat (above about 5% fat) puddings due to the presence of fat and stabilizers. Protein in the presence of a fat and an emulsifier/stabilizer component, coats the surface of the fat and minimizes the likelihood of protein aggregation.

This invention is particularly useful in formulating the low/no fat puddings described in copending, commonly-assigned to U.S. Pat. Ser. No. 07/800,617 filed Nov. 27, 1991 wherein sodium alginate, or another calcium-sensitive, irreversible gelling hydrocolloid is used as a partial or total fat replacement. This invention should be equally useful in formulating low/no fat pudding where fat is replaced with other known fat replacement or fat mimetic ingredients such as the starch-based materials of U.S. Pat. No. 4,510,166, the protein material of U.S. Pat. No. 4,734,287, the carbohydrate materials described in U.S. Pat. No. 4,911,946 or the proteinaceous macrocolloids of U.S. Pat. No. 4,985,270.

Puddings formulated in accordance with this invention should possess a pH of from about 6.5 to 7.5.

It has also been found that this invention permits the reduction or elimination of any emulsifier/stabilizer component use in formulating the puddings. It has been believed by those skilled in the art that ready-to-eat pudding formulations needed to contain an emulsifier/stabilizer ingredient to assist in the emulsification of any fat contained therein and/or to stabilize proteins. Sodium stearoyl-2-lactylate has to date been the emulsifier/stabilizer of choice; however, mixtures of mono- and diglycerides prepared by direct esterification of edible fatty acids and glycerine and other like materials should also be useful for this purpose. The elimination or reduction of these fatty acid esters not only represents a cost saving but also would lower the measured fat level of the pudding.

DETAILED DESCRIPTION OF THE INVENTION

Ultra-high temperature (above 265° F.) processed and packaged, pudding formulations are prepared using a combination of conventional ready-to-eat pudding ingredients, such as water, milk solids (e.g., non-fat milk solids) and/or another source of milk-like protein, starch (i.e., uncooked starch) and/or other thickening or gelling agents, sweetener (e.g., sucrose), fat or fat substitute, and possibly emulsifier/stabilizer, in combination with from 0.005 to 0.5% of a polyphosphate salt.

According to one method for preparing the pudding product of this invention, the liquid ingredients, such as water and milk (e.g., whole, low-fat or skim milk), are mixed and heated to a temperature between about 90 and 130° F. Any fatty ingredients (e.g. added fats, emulsifiers and/or stabilizers) may then be blended into the heated liquid components. The dry ingredients, including the polyphosphate salt, may then be added to the liquid mix using a relatively high level of agitation. An induction mixer is one type of device for providing the desired agitation. Any volatile flavor component should be added last in order to minimize. The polyphosphate may, if desired, be predissolved in a portion of the aqueous medium.

The mixture is thoroughly mixed, such as in a homogenizer, cooked at a temperature above 265° F., preferably 275 to 300° F., and then cooled. Cooking may be effected using either direct or indirect heat with a scraped-surface heat exchanger being typical for indirect heating and steam injection being a typical procedure for supplying direct heat. The cooling step should be done while the mix is being subjected to shear conditions. Cooling may be accomplished using plate, tubular and/or scraped-surface heat exchangers. The cooled pudding formulation is then packaged at a temperature below 140° F., preferably below about 110° F. and typically at about 75° F.

The puddings of this invention will have a composition in accordance with the following formula which represents an unflavored and uncolored pudding mix.

| Ingredient | Broad Range (% weight) | Preferred Range (% weight) |
| --- | --- | --- |
| Water | 60–85 | 68–80 |
| Sweetener | 0.05–25 | 7–17 |
| Starch (uncooked) | 2–9 | 3.5–7 |
| Non-Fat Milk Solids | 1.5–10 | 2–7 |
| Fat | 0–6 | 0–6 |
| Emulsifier/Stabilizer | 0–0.5 | 0.1–0.4 |
| Fat Substitute | 0–6 | 0.01–1.5 |
| Polyphosphate Salt | .005–0.5 | .02–0.2 |

Flavor and color agents and other functional ingredients may be added to the pudding formulation as desired so as to produce the desired end product, such as vanilla, chocolate or butterscotch pudding. The use of a food-grade alkali to adjust the pH of the pudding to a range of about 6.5 to about 7.0 may be desirable.

The sweetener component employed in formulating the pudding composition of the present invention is chosen to provide a desired degree of sweetness and solids to the final pudding product. Sucrose is the preferred sweetener component, but other sweet mono-, di- or polysaccharides may be employed as all or a portion of the sweetener component, such as dextrose, fructose, corn syrups or corn syrup solids, high fructose corn syrups and the like. Nutritive and non-nutritive intensive sweeteners such as saccharin, Sucralose TM, Acesulfame K TM and the like may also be employed as all or part of the sweetener component. The use of intensive sweeteners may be accompanied by use of suitable sweet or non-sweet bulking agents to provide a desired solids levels; however, bulking agents will typically not be needed. All of these components are to be included in the term "sweetener" as employed in this invention; provided however, that in the case of syrups only the solids portion is included as sweetener.

As will be appreciated by those skilled in the art, this invention could be utilized in the formulation of low/no fat and low/no sugar puddings by the use of fat substitutes and intensive sweeteners. If desired, the pudding could be free of all sugars by using lactose-free milk solids or non-milk proteins, such as proteins which have an ionic character similar to milk protein.

The pudding composition of the present invention preferably may also contain an emulsifier/stabilizer component to contribute to the desired firm, smooth texture. A commonly-used emulsifier/stabilizer is sodium stearoyl-2-lactylate. Other suitable emulsifier/stabilizer ingredients include, for example, mixtures of mono- and diglycerides prepared by direct esterification of edible fatty acids and glycerine.

The term emulsifier/stabilizer is meant to indicate that the ingredient serves as both an emulsifier and a stabilizer. In the case of fat-free puddings, the emulsifier functionality is not needed and the ingredient functions solely as a stabilizer. In the case of fat-containing puddings, the ingredient provide both emulsifier and stabilizer functionalities. As noted above, however, one use the polyphosphates of the invention is the elimination of emulsifier/stabilizer ingredients.

The term fat-free, as used in this invention, is meant to include the presence of a low amount of a fatty emulsifier/stabilizer material or fat from other sources so long as the pudding contains less than 0.5 grams of fat per serving. It is also within the scope of this invention that, in accordance with copending, commonly assigned U.S. Pat. application, Ser. No. 07/800,617, that all or a portion of the fat is replaced with a calcium-sensitive, irreversible, gelling hydrocolloid such as sodium alginate. As previously noted, however, other fat substitute/replacement technologies may also be employed.

For the non-fat puddings of this invention, water, skim milk and/or non-fat milk solids will be typically utilized. For those puddings which contain fat, low-fat or whole milk may be used as ingredients as well as any non-milk fat or oil, such as any unprocessed or processed (e.g., hydrogenation, fractionation, interesterification) vegetable or animal fat or oil or fraction thereof, such as derived from soybean oil, corn oil, coconut oil, cottonseed oil, peanut oil, safflower oil, palm kernel oil, sunflower oil, palm oil, rapeseed oil or the like.

According to a preferred embodiment of this invention the starch component of the pudding formulation consists of a combination of higher and lower modified, uncooked starches typically at a weight ratio of 1:1 to 9:1. The higher modified starch is typically a cross-linked, substituted starch, such as tapioca, waxy maize or corn starch. The lower modified (e.g., unmodified) starch will typically be a tapioca, waxy maize or corn starch.

For producing the packaged, ready-to-eat puddings of this invention the various ingredients of the composition are initially admixed, such as in the manner described above. The mixture is then mixed to effect thorough and complete dispersion, such as by homogenization. Typically, the mixture is heated to a temperature of up to about 160° F. and then passed through a mixing apparatus (e.g., a Manton-Gaulin TM homogenizer or a Bran-Lubbe TM homogenizer) in either a single or multiple-stage at an appropriate pressure. Since the preparation of home-made puddings has no true counterpart to a homogenization step, the products made according to the present invention can often be characterized as having textural and organoleptic properties even more preferred than the home-made "standard".

The ultra-high temperature processing of the pudding composition typically will be conducted in scraped-surface heat exchange apparatus so as to best accommodate the increasing viscosity of the mixture during heating. Typically, the composition will be heated to a temperature of about 140° F. prior to being passed to ultra-high temperature processing. In the ultra-high temperature processing apparatus, the composition will typically be heated to a temperature range of from about 275° F. to about 300° F. and then introduced into a suitable holding tube, to be held there at such temperature for the necessary time required to effect cooking and microbial kill. Thereafter, the cooked composition is cooled to a temperature suitable for filling into containers which are then sealed. Where the product container is a plastic material to be sealed with an adhesively-applied foil lid, cooling to a product temperature of below about 130° F., and preferably to below 110° F.

In commercial operation it may be desirable to provide a hold tank between the homogenization step and the cooking step in order to serve as a buffer against process disruptions. If such a tank is present, the tank should keep the pudding temperature at about 40° F. to retard microbiological growth.

If an aseptic-packaging process is to be implemented, the process will further include steps of sterilizing the containers and lids into which the sterilized pudding is packaged and then filling the container with pudding in a sterile environment. Such known methods as superheated steam, hydrogen peroxide, ultraviolet light, high-intensity light, etc., are useful for sterilizing the packaging materials which, in the case of pudding, are typically composed of single-service, cup-shaped, plastic containers and flexible lid stock. The lid stock, may be foil-laminated polyester with a heat-sealable coating which will be heat sealed onto the container. The plastic container may be a thermoformed or molded container fabricated from a material such as high-impact polystyrene. These steps would also be desirable to reduce microbial activity even in the event that a true aseptic process in not being sought, such as when the pudding is placed in a refrigerated distribution system and sterility is not required but extended storage life is desirable.

This invention is further described but not limited by the following examples.

EXAMPLE 1

A vanilla-flavored, fat-free pudding was prepared having the following formulation:

| Ingredient | Weight % |
|---|---|
| Skim Milk | 71.01 |
| Water | 10.55 |
| Sucrose | 12.28 |
| Starch | 5.00 |
| Sodium Stearoyl Lactylate | 0.20 |
| Sodium Alginate | 0.18 |
| Flavor & Colors | 0.70 |
| Polyphosphates (50% tetrasodium/ 50% sodium acid pyrophosphate) | 0.08 |

The pudding was prepared by adding water and skim milk to a batch tank and heating to 135° F. (57.2° C.). The sodium lactylate is then added to the tank. The remaining ingredients (except flavors) were then added and the temperature of the mix was again brought to 135° F. (57.2° C.). The pyrophosphates were predissolved in water to insure full solubility. Flavors were added and the mix was homogenized at 2000 psig in a first stage and 500 psig in a second stage. The temperature was maintained at about 125° F. to 130° F. (51.7° to 54.4° C.) during homogenization. The mixture was then cooled to about 40° F. (4.4° C.) and held in a tank prior to being pumped in a continuous manner through a series of plate heat exchangers, wherein the temperature is raised to 185° F. (85° C.) and then through a series of scraped-surface heat exchangers where the temperature is elevated to 280° F. (137.7° C.). The formulation is maintained at 280° F. (137.7° C.) for about 20 seconds and then immediately cooled to about 150° F. (65.6° C.). The pudding formulation is then further cooled to 75° F. (21.1° C.) and packaged in single-serving plastic cups.

After one-day refrigerator storage the pudding was found to possess a desirable texture and mouthfeel with no detectable protein aggregates and comparable to pudding containing up to 5% fat. Viscosity of the pudding increases to a desirable thickness during the first day of storage. This desirable texture and mouthfeel was maintained after eight months of refrigerated storage.

Having thus described the invention what is claimed is:

1. A packaged, 265° F. or higher temperature-processed ready-to-eat pudding containing water, a protein source, from 2 to 9% starch, sweetener, fat at a level of 0 to 3%, and from 0.005 ti 0.5% of pyrophosphate salts, selected from the group consisting of tetrasodium pyrophosphate and disodium dihydrogen pyrophosphate, said pyrophosphates being present at a level which will reduce protein aggregation during high temperature processing at 265° F. or higher such that no visually perceptible aggregates are present and essentially all of the aggregrates have a maximum dimension of less than 40 microns.

2. The pudding of claim 1 wherein the pudding is cocoa-free.

3. The pudding of claim 1 wherein the pudding is fat-free.

4. The pudding of claim 1 wherein a majority of the protein aggregates have a maximum dimension of less than 10 microns.

5. The pudding of claim 1 wherein the formulation has added thereto from 0.01 to 0.5% of sodium alginate.

6. The pudding of claim 1 which is free of fat-based emulsifiers.

7. The pudding of claim 6 wherein the pudding is fat-free.

8. The pudding of claim 1 which is free of sodium stearoyl lactylate.

9. The pudding of claim 1 wherein protein source is milk protein.

10. The pudding of claim 1 wherein the thickening agent comprises uncooked starch.

11. The pudding of claim 1 wherein the pH is about 6.5 to about 7.5.

* * * * *